Jan. 18, 1938.    A. W. WOODWARD    2,105,829
WHEEL OR RIM
Filed Dec. 20, 1935
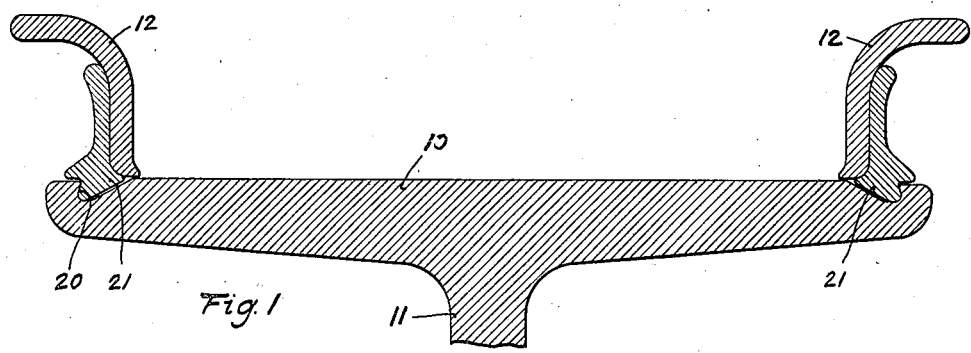
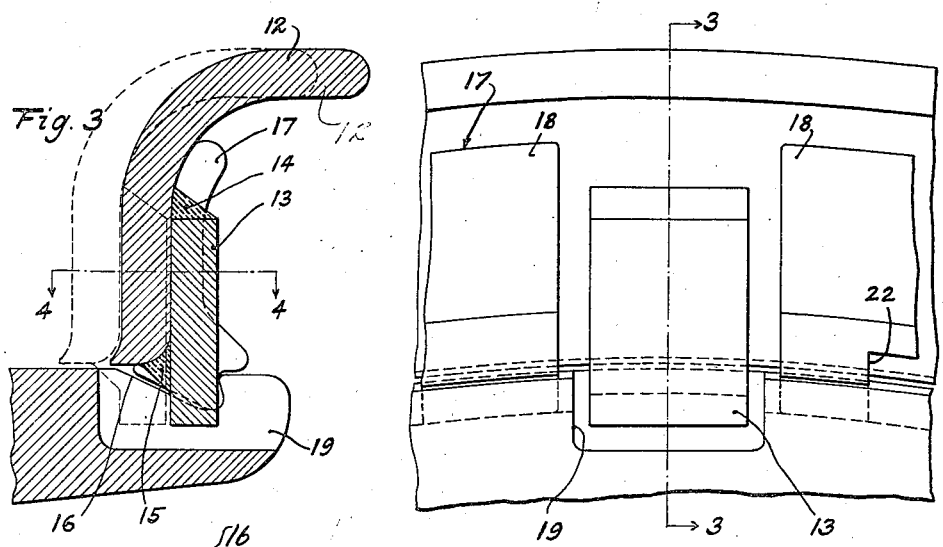
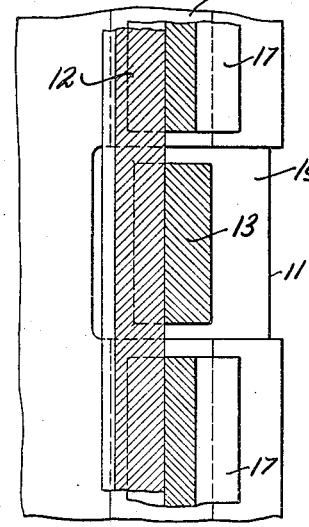
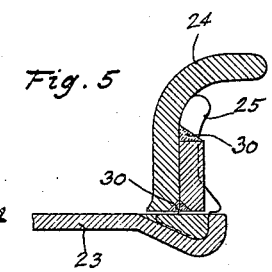
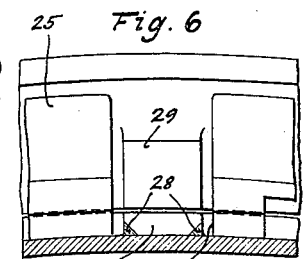
Inventor
ALVA W. WOODWARD
By
Attorney Patented Jan. 18, 1938

2,105,829

UNITED STATES PATENT OFFICE 2,105,829

WHEEL OR RIM

Alva W. Woodward, Kent, Ohio, assignor to Wingfoot Corporation, Wilmington, Del., a corporation of Delaware Application December 20, 1935, Serial No. 55,386

8 Claims. (Cl. 152—21)

The present invention relates to wheels or rims and is particularly concerned with the means provided for mounting a tire on the wheel or rim. In the present description, I have shown my invention as applied to a wheel, but it is obvious that the felloe of the wheel may be a rim which in turn is mounted on a suitable wheel and, therefore, I wish to have it understood that the invention is not limited to a wheel and in the claims, when reference is had to either a felloe or to a rim, it is not intended that these terms be limited in that respect, as either may be used in practicing this invention without departing from the scope thereof.

An object of this invention is to provide a mounting for tires which comprises a base on which the tire is mounted, and which is provided with suitable demountable side flanges to hold the tire in place on the base. Either both side flanges or one side flange is made demountable, although in the drawing I have shown both side flanges as being demountable.

Another object of this invention is to provide a simple and efficient means for locking the side flange in position in rotation relative to the base, and for also providing means for preventing rotation of the locking ring relative to the side flange and/or base.

Another object of this invention is to provide a side flange with a driving plate or lug which engages within a suitable recess in the base to prevent relative rotation between the side flange and the base.

Another object of this invention is to provide on a demountable side flange a driving lug which engages within a recess in the base and also within a recess in a locking ring, preferably of the split type, whereby relative rotation between all these parts is prevented except for small amounts permitted for clearance.

Another object of this invention is to provide a demountable side ring which may be quickly applied and removed and readily retained in place by means of a split-type locking ring.

Other objects of this invention will appear hereinafter as the description thereof proceeds, the novel features, arrangements and combinations being clearly set forth in the specification and in the claims thereunto appended.

In the drawing:

Fig. 1 is a cross-section through the felloe of a wheel embodying my invention, the side flanges and locking rings being shown in operative position;

Fig. 2 is a fragmentary side elevational view of the device shown in Fig. 1;

Fig. 3 is a cross-section taken substantially along the line 3—3 of Fig. 2;

Fig. 4 is a cross-section taken substantially along the line 4—4 of Fig. 3;

Fig. 5 is a view similar to Fig. 3 illustrating a modification of my invention; and Fig. 6 is a view similar to Fig. 2 showing a still further modification of my invention.

In devices of this character, it is very important that the retaining flanges or side flanges which abut against the side walls and beads of the tire be firmly held against rotation relative to the felloe or rim, in order that there will not be too much friction between these flanges and the tires and in order that there will be a proper driving of the tire through the intermediacy of the side flanges as well as through the base of the tire and the peripheral surface of the wheel or rim.

My invention, as shown in the drawing, is applied to a wheel having a felloe 10 supported centrally by means of a web 11 or spokes as may be desired. Any suitable mounting for the felloe can be used and the felloe may in turn be a rim which is demountably mounted on a central wheel structure.

The felloe is provided at opposite edges thereof with side flanges 12 which are adapted to abut against the side walls of the tire, each of these being similarly mounted on the edge of the felloe and, therefore, a description of the mounting for one of these side flanges will be sufficient, as the other is mounted in exactly the same way, although one flange could be rigidly formed on the felloe if desired.

A driving plate or lug 13 is secured on the outside of the flange 12, as by bunch welding at the points 14 and 15. The felloe is provided with a peripheral groove 16 having a cross-section such as that illustrated in Figs. 1 or 3 and this groove is adapted to receive the split locking ring 17 having the opposite ends 18 thereof spaced apart a distance somewhat more than the width of the driving plate or lug 13, as will be apparent from an inspection of Fig. 2. The felloe is provided with a horizontally extending recess 19 adjacent the edge of the felloe and this recess is deeper than the annular groove 16 and of a width which is somewhat more than the width of the driving lug or plate 13, as will be seen from an inspection of Fig. 2.

The side flange 12 is continuous, inextensible and preferably rigid, as this type of wheel is adapted primarily for use with truck tires. The inner diameter of the side flange 12 is just slightly more than the outer diameter of the felloe so as to permit the side flange to be slipped over the felloe with the driving lug or plate 13 arranged within the recess 19.

The tire is first placed on the rim and then the side flanges put in place, or one side flange may be put in place beore the tire is applied, the other side flange being put in place after the tire is applied to the felloe, but before the tire is inflated. This permits the flange to be moved inwardly toward the central plane of the felloe in order that the locking ring 17 may be put in place. It will be noted from an inspection of Figs. 1 and 3 that the locking rings have noses 20 adapted to lie in an undercut portion of the groove 16 and portions 21 adapted to lie under the side flanges 12. In order that the side flanges will not have their inward movement arrested too soon, the recess 19 is made of such a length as to permit the side flanges to move inwardly a sufficient amount prior to application of the locking ring before the driving lug 13 strikes the end of the recess. In other words, in assembling the side ring the side ring is first moved to the dotted-line position in Fig. 3 and then the locking ring 17 slipped in place in the usual manner so that the nose portion rests within the groove 16, the ends 18 of the locking ring being arranged on opposite sides of the driving lug or plate 13. The side flange 12 is then moved to the full-line position shown in Fig. 3, either manually or under the pressure of the side walls of the tire when the same is being inflated. The portion 21 on the locking ring underlies the side flange and is therefore held against upward movement out of the groove 16. The driving lug 13, which is arranged between the ends 18 on the locking ring and within the recess 19, prevents substantial movement of the locking ring peripherally relative to the side flange and/or felloe and at the same time prevents relative peripheral movement of the side flange relative to the felloe.

It will be noted that with this construction the inner side of the side flange is unobstructed and the felloe is similarly unobstructed between the side flanges so as to provide a satisfactory seat for the tire.

In order to provide a means for ready removal of the locking ring when the tire is to be demounted, I provide a notch 22 in the underside of the locking ring and of sufficient width and depth as to expose a portion of this notch 22 above the felloe, as is common in rings of this nature. A tire tool is inserted in the notch to lift the locking ring out of the recess 16 in the usual manner after the side flange has been moved to the dotted-line position shown in Fig. 3.

Of course, it will be understood that the felloe is provided with a suitable slot for the reception of the valve stem of the inner tube used in the tire, as is customary in devices of this character. It will also be understood that other means may be used for securing the driving lug 13 to the side flange without departing from the spirit and scope of this invention and that it could be made of the same piece of material as the side flange. Furthermore, it will be obvious that the felloe could be a rim which is to be applied to a wheel instead of merely the felloe of the wheel itself, as it is shown in the drawing.

In Figs. 5 and 6 there is shown a modified form of my invention in which 23 represents the rim and 24 the side flange. A locking ring 25 similar to locking ring 17 is used to prevent the outward movement of the flange. The rim 23 is provided with a gutter 26 in which I weld a short block 27, as by the welding shown at 28, or otherwise suitably hold this block in position within the gutter. Obviously, if desired, the equivalent of this block could be formed by deforming a portion of the bottom of the gutter upwardly to form shoulders against which the ends of the locking ring 25 will abut in case the ring tends to shift peripherally. On the side flange I secure a driving lug 29 by means of welding, such as 30, or by any other suitable means, and this corresponds to the lug 13 in Fig. 3. The driving lug is also arranged between the ends of the locking ring 25 whereby the side flange is held against any substantial peripheral movement. Instead of having to form a recess, such as 19, in the first form of my invention illustrated, the rim may be formed uniformly throughout its entire periphery except that a lug, such as 27, is welded in place therein to provide an abutment. The edge of the rim, therefore, has a smooth appearance and there is less chance of dust and dirt working in to the tire, not to mention the extra strength given to the rim by having the peripheral edge of the rim continuous instead of interrupted as in Fig. 3.

Obviously, those skilled in the art to which this invention pertains may make various changes in the particular construction and arrangement of the parts shown in the accompanying drawing without departing from the spirit of this invention, and therefore I do not wish to be limited in my invention, except as hereinafter set forth in the claims.

Having thus fully described my invention, what I claim and desire to secure by Letters Patent of the United States is:

1. In a wheel, the combination with a rim portion having a peripheral locking-ring-receiving groove and a transverse driving-lug-receiving recess at the edge thereof, a side flange having a driving lug extending inwardly into said recess between the side walls thereof to prevent relative rotation between said side flange and rim, and a split locking ring arranged within said groove, the ends of said locking ring being spaced apart a sufficient distance to receive said lug whereby said lug prevents substantial relative rotation between said ring and felloe and also between said ring and side flange.

2. A wheel comprising a felloe, peripheral grooves in the outer surface of said felloe adjacent the edges thereof, split-type locking rings adapted to be arranged within said grooves, side flanges separate from said locking rings, driving lugs on said side flanges arranged between the ends of the respective locking rings to prevent relative rotation between said locking rings and their respective side flanges, said felloe also having depressions adjacent the outer edges thereof into which said driving lugs project to prevent relative rotation between said side flanges and felloe within certain prescribed limits.

3. A wheel comprising a felloe having a groove adjacent one edge thereof, a side flange, the outer wall of which is provided with a laterally and radially inwardly projecting lug, said felloe having a recess other than said groove for receiving the inwardly projecting portion of said lug, and a split locking ring having spaced ends arranged facing the sides of said lug, the locking ring also being arranged in said groove to hold said side flange in place.

4. In a device of the class described, the combination with a rim having a peripheral gutter adjacent one edge, an abutment in said gutter, a side flange, a split locking ring arranged partially in said gutter with the ends thereof on opposite sides of said abutment and a driving lug on said flange arranged between the ends of said split ring to prevent rotation of said ring relative to said flange.

5. In a device of the class described the combination with a rim having a gutter adjacent one edge for receiving a locking ring, a side flange, a locking ring arranged in said gutter for preventing outward movement of said flange axially of said rim and having a recess therein, a driving lug on said flange arranged within said recess to hold said flange and ring against relative peripheral movement, said driving lug engaging an abutment on said rim for preventing substantial relative peripheral movement of said flange and ring with respect to said rim.

6. In a device of the class described, the combination with a rim having an outwardly extending removable side flange embracing said rim, a locking ring for holding the side flange against outward movement, said ring being a substantially circular ring split to provide spaced end portions, said rim having an abutment near the outer edge thereof for preventing outward movement of said split ring when the latter is in place, and a single driving lug on said side flange arranged between the ends of said ring and between spaced abutments provided on said rim for preventing substantial relative rotation between said side flange, clamping ring and rim.

7. In a device of the class described, the combination with a rim having a peripheral groove on the outer surface thereof, a split locking ring adapted to fit in said groove and having an axially inwardly extending portion thereon, a side flange having a radially inwardly projecting lug spaced outwardly from the inner surface of said ring, said rim having a transverse recess in the surface thereof extending substantially axially for receiving said inwardly projecting lug and terminating inwardly of the edge of said rim at a point short of the inner surface of the side flange when the latter is in operative position, the said side flange overlying said inwardly extending projection on said clamping ring when said side flange is in operative position whereby to prevent radially outward movement thereof relative to said rim, the said driving lug engaging the walls of said axial recess to prevent substantial relative peripheral movement between said side flange and rim.

8. A rim comprising a base portion having a demountable side flange embracing said base portion and being provided with an axial recess extending inwardly from the edge of said base portion, a lug abutting the outer wall of said side flange and secured permanently thereto, said lug extending inwardly toward the axis of said base portion and into said recess whereby said lug engages the walls of said recess to prevent relative peripheral movement of said side flange and base portion, and a locking ring for preventing outward axial movement of said side flange having means thereon cooperating with said lug to prevent relative peripheral movement between said ring, base portion and side flange.

ALVA W. WOODWARD.